(12) United States Patent
Zhang et al.

(10) Patent No.: US 7,515,782 B2
(45) Date of Patent: Apr. 7, 2009

(54) TWO-CHANNEL, DUAL-MODE, FIBER OPTIC ROTARY JOINT

(76) Inventors: Boying B. Zhang, 10 Stonicker Dr., Lawrenceville, NJ (US) 08648; Hong Zhang, 2203 Deer Creek Dr., Plainsboro, NJ (US) 08536

( * ) Notice: Subject to any disclaimer, the term of this patent is extended or adjusted under 35 U.S.C. 154(b) by 0 days.

(21) Appl. No.: 11/410,939

(22) Filed: Mar. 17, 2006

(65) Prior Publication Data

US 2007/0217736 A1 Sep. 20, 2007

(51) Int. Cl.
*G02B 6/26* (2006.01)
*G02B 6/32* (2006.01)
(52) U.S. Cl. ............................... 385/15; 385/26; 385/33
(58) Field of Classification Search ........................ None
See application file for complete search history.

(56) References Cited

U.S. PATENT DOCUMENTS

| | | | | |
|---|---|---|---|---|
| 4,725,116 A | * | 2/1988 | Spencer et al. ................. | 385/26 |
| 4,842,355 A | * | 6/1989 | Gold et al. ..................... | 385/26 |
| 5,039,193 A | * | 8/1991 | Snow et al. .................... | 385/25 |
| 5,588,077 A | * | 12/1996 | Woodside ..................... | 385/26 |
| 5,778,123 A | * | 7/1998 | Hagan et al. .................. | 385/76 |

* cited by examiner

*Primary Examiner*—Omar Rojas

(57) ABSTRACT

A two-channel fiber optic rotary joint of this invention can transmit simultaneously optic signals along two optic passes through a single mechanical rotational interface. The first channel of light path consists of a pair of fibers, co-axially fixed in 2 holders respectively. The light signal from one of the fiber can be directly coupled into another fiber. The second channel of light path is off-axis arranged, including a pair of conventional collimators, a pair of first reflecting surfaces and a pair of second reflecting surfaces. The light signal emitted from one of the said conventional collimator will be reflected by one of the said first reflecting surface, one of the said second reflecting surface, another said second reflecting surface, and another said first reflecting surface, then coupled into another said conventional collimator.

5 Claims, 3 Drawing Sheets

TWO-CHANNEL, DUAL-MODE, FIBER OPTIC ROTARY JOINT

BACKGROUND OF THE INVENTION

1. Field of the Invention

The invention is related to two channel fiber optic rotary joint in the field of optic transmission through a mechanical rotational interface.

2. Description of Related Art

The Fiber optic Rotary Joint (FORJ) is the opto-mechanical device which allows uninterrupted transmission of an optical signal in a fiber guide through a rotational interface to a stationary apparatus. FORJ can be categorized as active and passive. An active FORJ consists of a light on either rotor side or stator side and a photo detector on another side and the signal transmission is limited to unidirectional. The disadvantage of active FORJ is requirement for electrical power. The passive FORJ is intended to transfer optical signals from fiber to fiber without any electronic or electrical units. The use of FORJ can be widely found in missile guidance systems, robotic systems, remotely operated vehicles (ROVs), oil drilling systems, sensing systems, and many other field applications where a twist-free fiber cable is essential. Combined with electrical slip rings or fluid rotary joints, FORJs add a new dimension to traditional rotary joints. As fiber optic technology advances, more and more traditional slip ring users will benefit from FORJs in their new fiber systems. This issue can be solved relatively easy if only a single channel is to be transmitted because it can be transmitted by keeping alignment between the optical axis and mechanical rotational axis. However, the transmission results in difficulties when it is desired to transmit two channels separately from each other through a single rotation interface.

A couple of prior inventions of two channel fiber optic rotary joint are described in the following patents: U.S. Pat. No. 5,588,077, U.S. Pat. No. 4,842,355, and U.S. Pat. No. 47,251,116.

In U.S. Pat. No. 5,588,077, the two optic fiber channels are arranged in-line along the same rotational axis. Isolation of one channel from the other is achieved through a novel application of gradient index rod lenses of suitable pitch. A pair of lenses is arranged adjacent each other on each side of the rotational interface and a second pair of axially aligned lenses is arranged outboard of the first pair. An optic signal from one of the outboard lenses can be directed to one of the other lenses depending on the pitch selection. The drawback of this design is that the losses due to crosstalk and overlap of the signal paths would be pretty significant.

Gold, et al designed another two channel FORJ in U.S. Pat. No. 4,842,355. A first channel signal is delivered to an optic fiber transmitted coaxially of the stationary and rotary side, transfer across the rotational plane between the two components being accomplished by opposing centrally located optic lenses. A second channel transmitted through a second optic fiber is delivered to a lens system which converts the light into a cylinder of light coaxial with the first channel and which surrounds the optic management for the first channel. Second channel thus are converted into coaxial hollow cylinders of light. These cylinders of light are transmitted between facing lens systems in the rotary and stationary sides of the apparatus. But the facing lens systems are very difficult to be fabricated.

Spencer, et al shows in U.S. Pat. No. 47,251,116 a two-channel and multi-channel FORJ. Within the joint reflecting surface are used to redirect off-axis optic signals onto the joint axis, with relative rotation occurring while the signals are on-axis. A rotating member for each channel has a reflecting surface for reflecting the on-axis signal portion off-axis to a receptor fiber. Alignment between the rotating member and the receptor fiber, as well as drive for the rotating member, is provided by a pair of magnets of opposite polarity, one being secured to the rotating member and the other being secured to the rotor. But it could be very difficult for the magnetic interaction to accurately ensure the synchronous rotation of the rotor and the rotating member. The size of the magnetic element and the adjustment of the reflecting surface also increase the size of the invented embodiment.

SUMMARY OF THE INVENTION

The first object of the present invention is to utilize the conventional fibers, collimators, and reflecting surfaces to realize a two-pass fiber optic rotary joints which can simultaneously transmit optical signals through a single mechanical rotational interface with a very low-profile and compact structure.

Another object of the present invention to minimize the need for maintaining precise axial alignment between the rotating and non-rotating elements of a two channel fiber optic rotary joint so that it could be used in any harsh environments such as temperature change, vibration and shock.

DETAILED DESCRIPTION OF THE INVENTION

Figure 1:
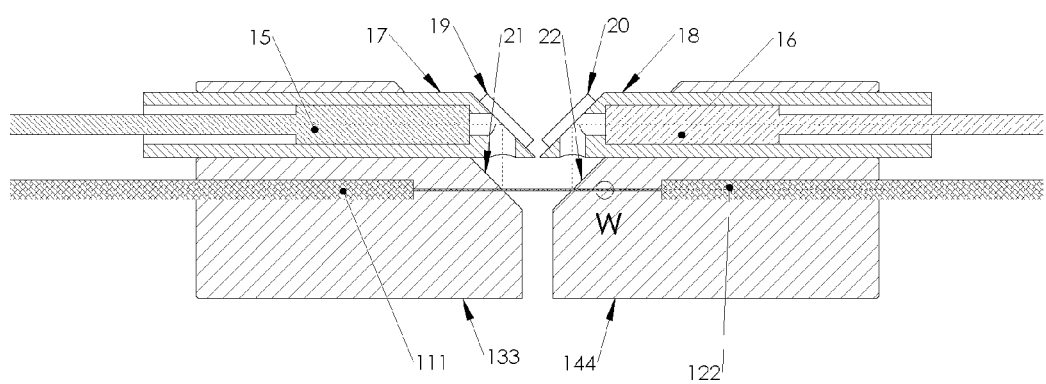
FIG. 1 shows a cross sectional view of the basic embodiment of the invention.
Figure 2:
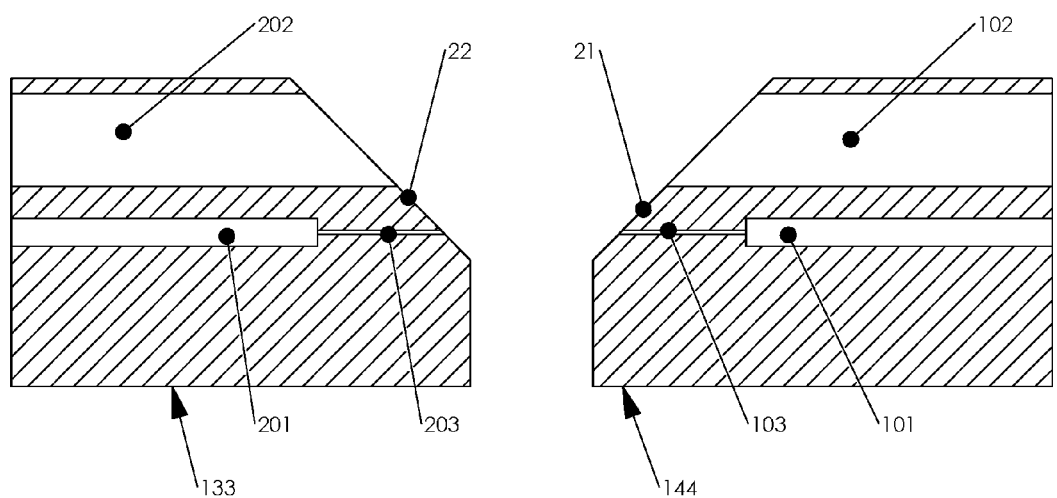
FIG. 2 is the cross section view of the holder for the collimator assembly.
Figure 3:
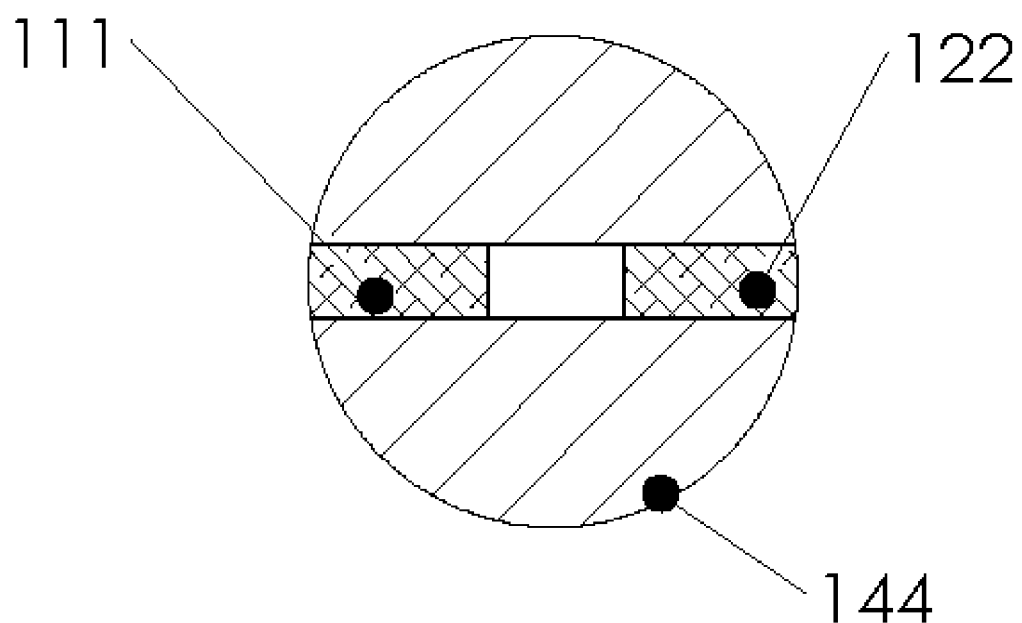
FIG. 3 is an enlarged view of micro-rotational interface in FIG. 1.

FIG. 1 illustrates a basic design of a two-channel fiber optical rotational interface. The holder 133 and 144 can be rotatable relative to each other. The axis of the rotation is the geometrical axis 101, 201 of the holder 133 and 144 (shown in FIG. 2). The first channel of light pass consists of a optic fiber 111 which is fixed on the axis 101 of holder 133, and another optic fiber 122 which is fixed on the axis 201 of holder 144. The diameter of the optic fiber is about 0.125 mm. The holder 133 and 144 have a through central hole 103, 203 at the diameter of 0.126 mm, slightly larger than the diameter of fiber 111 and 122. Fiber 111 should be longer than fiber 122 so that it could get into the central hole 103 of holder 144. The end surfaces of fiber 111 and 122 are oppositely positioned inside the central hole 103 of holder 144 on the rotational axis but separated by a clearance about 0.5 um. An enlarged view inside of central hole of holder 144 is shown in FIG. 3. When the holder 133 and 144 rotates relatively each other, the fiber 111 can be rotating inside the central hole of holder 144 relative to fiber 122. Thus forms a micro rotational interface, or "micro bearing". The micro bearing is able to compensate the mechanical alignment error of the two fibers so that the alignment task would be just focused on second channel.

The second channel of light pass includes conventional collimator 15 and 16, which are fitted inside of collimator housing 17 and 18 respectively, and reflecting surface 19 and 20. The collimator housing 17 and 18 are off-set on the holder 133 and 144 respectively, with their own axis 102, 202 parallel to the rotational axis 101, 201. The angled surface 21 on holder 133 and the angled surface 22 on holder 144 are coated optical reflecting surface. The reflecting surface 19 and 20 are supposed to be adhered to the angled surface of collimator housing 17 and 18 and parallel to the optical surface 21 and 22 respectively. When the light beam emitted from one of the collimator 15, it will be reflected by the reflecting surface 19, 21, 22 and 20, then get into another collimator 16. Vise versa. The second light pass can be remained when the holders 133 and 144 rotate relatively. Thus a two-channel passive FORJ is obtained. The beam diameter of the conventional collimator can be significantly larger than fiber diameter to reduce loss due to the presence of center fiber. Extremely low cross-talk between the channels could be ensured by the fiber cladding.

Although the present invention has been described in several particular embodiments of an FORJ, it is expected that additional embodiments and modification will be apparent without departing from the spirit of the invention.

The invention claimed is:

1. A two-channel fiber optic rotary joint for optic signal transmissions comprising:
    a pair of relatively rotatable members comprising a rotor and a stator;
    said rotor is mounted in said stator to rotate relatively thereto through a pair of ceramic ball bearings;
    a first fiber optical collimator assembly being secured in a central hole of one of said rotatable members;
    a second fiber optical collimator assembly being secured in a central hole of another of said rotatable members;
    a shaft seal, a seal holder and o-ring means to seal the collimator assembly of said stator and said rotor to form a sealed space with said first fiber optical collimator assembly and second fiber optical collimator assembly;
    wherein each of said first fiber optical collimator assembly and said second fiber optical collimator assembly further comprises:
        a holder with an angled end surface;
        a conventional collimator secured in an off-axis hole of said holder with an angled end surface through a hollow collimator housing with its own axis parallel to a rotational axis;
        a first reflecting surface located on the front end of said hollow collimator housing at a specific angle with the axis of said conventional collimator and parallel to said angled end surface of said holder;
        a second reflecting surface being formed on said angled end surface of said holder;
    a first fiber secured in a central hole of the holder of said first fiber optical collimator assembly and protruded out of said central hole of the holder of said first fiber optical collimator assembly; and
    a second fiber secured in a central hole of the holder of said second fiber optical collimator assembly and recessed inside said central hole of the holder of said second fiber optical collimator assembly.

2. The two-channel fiber optic rotary joint of claim 1, wherein further comprising:
    a first channel of light path having said micro-collimators co-axially fixed in said holders respectively;
    a light signal from one of said micro-collimator directly coupled into another micro-collimator;
    a second channel of light path including said conventional collimators and said first reflecting surface and said second reflecting surface; and
    the light signal emitted from one of the said conventional collimator will be reflected by one of the said first reflecting surface, one of the said second reflecting surface, another said second reflecting surface, and another said first reflecting surface, then coupled into another said conventional collimator.

3. The two-channel fiber optic rotary joint of claim 2, wherein said first channel of light path further comprising:
    said first fiber and said second fiber; said first fiber protruding into the central hole of said second holder; the end surfaces of said first fiber and said second fiber being oppositely positioned inside the said central hole of said second holder on the rotational axis but separated by a clearance;
    the diameter of central hole of said holders being larger than the diameter of said fibers have;
    the light signal from one of said fibers directly coupled into another said fiber;
    a second channel of light path including said conventional collimators and said first reflecting surface and said second reflecting surface; and
    the light signal emitted from one of the said conventional collimator will be reflected by one of the said first reflecting surface, one of the said second reflecting surface, another said second reflecting surface, and another said first reflecting surface, then coupled into another said conventional collimator.

4. A two-channel fiber optic rotary joint for optic signal transmissions comprising:
    a first fiber optic collimator assembly with a rotary axis;
    a second fiber optic collimator assembly with a rotary axis;
    said first fiber optic collimator assembly and said second fiber optic collimator assembly are aligned with said rotary axes and relatively rotatable along said rotary axes;
    wherein each of said first fiber optic collimator assembly and said second fiber optic collimator assembly further comprises:
        a holder with an angled end surface having a central hole along said rotary axis and an off-axis hole which is parallel to said central hole;
        a conventional collimator secured in said off-axis hole of said holder with an angled end surface through a hollow collimator housing;
        a first reflecting surface located on the front end of said hollow collimator housing at a specific angle with the axis of said conventional collimator and parallel to said angled end surface of said holder; and
        a second reflecting surface being formed on said angled end surface of said holder;
        a first fiber secured in the central hole of the holder of said first fiber optic collimator assembly and protruding out of said central hole of the holder of said first fiber optic collimator assembly; and
        a second fiber secured in the central hole of the holder of said second fiber optic collimator assembly and recessed inside said central hole of the holder of said second fiber optic collimator assembly.

5. The two-channel fiber optic rotary joint of claim 4, wherein a first channel of light path including said first fiber and said second fiber, further comprising:
    said first fiber protruding into the central hole of said second holder;
    the end surfaces of said first fiber and said second fiber being oppositely positioned inside the said central hole of said second holder on the rotational axis but separated by a clearance;

the diameter of the central hole of said holders being larger than the diameter said fibers have;

a light signal from one of said fibers directly coupled into another said fiber;

a second channel of light path including said conventional collimators and said first reflecting surface and said second reflecting surface; and the light signal emitted from one of the said conventional collimator will be reflected by one of the said first reflecting surface, one of the said second reflecting surface, another said second reflecting surface, and another said first reflecting surface, then coupled into another said conventional collimator.

* * * * *